US011090890B2

(12) United States Patent
Marchini et al.

(10) Patent No.: US 11,090,890 B2
(45) Date of Patent: Aug. 17, 2021

(54) PROCESS FOR BUILDING TYRES FOR VEHICLE WHEELS

(71) Applicant: Pirelli Tyre S.p.A., Milan (IT)

(72) Inventors: Maurizio Marchini, Milan (IT); Andrea D'Ambrosio, Milan (IT); Antonio Mirto, Milan (IT); Pierluigi Crippa, Milan (IT); Gianni Mancini, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 594 days.

(21) Appl. No.: 15/202,268

(22) Filed: Jul. 5, 2016

(65) Prior Publication Data
US 2016/0375646 A1    Dec. 29, 2016

Related U.S. Application Data

(62) Division of application No. 13/389,777, filed as application No. PCT/IB2010/001925 on Jul. 29, 2010, now Pat. No. 9,399,328.

(Continued)

(30) Foreign Application Priority Data

Aug. 12, 2009    (IT) ........................... MI2009A001468

(51) Int. Cl.
*B29D 30/20*    (2006.01)
*B29D 30/12*    (2006.01)
(Continued)

(52) U.S. Cl.
CPC ........... *B29D 30/12* (2013.01); *B29D 30/005* (2013.01); *B29D 30/0016* (2013.01);
(Continued)

(58) Field of Classification Search
CPC .. B29D 30/0016; B29D 30/005; B29D 30/26; B29D 30/32; B29D 30/20;
(Continued)

(56) References Cited

U.S. PATENT DOCUMENTS 2,319,643 A    5/1943    Sternad et al.
2,818,907 A    1/1958    Sapp
(Continued)

FOREIGN PATENT DOCUMENTS

CN    1520354 A1    8/2004
EP    0 448 407 A2    9/1991
(Continued)

OTHER PUBLICATIONS

Russian Decision of Grant Patent dated Aug. 25, 2014 in corresponding Russian Application No. 2012108842/05(013281).
(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A process for building tyres for vehicle wheels are disclosed, wherein said building process comprises the following steps carried out in a carcass structure building line: a) associating a pair of support rings with a forming drum in a work station for associating support rings; b) building at least one structural component of the tyre being processed on the forming drum provided with said pair of support rings in at least one work station of the carcass structure building line; c) removing the pair of support rings from the forming drum in a work station for removing support rings; d) transferring the pair of support rings dissociated from the forming drum in a temporary storage for support rings; e) building at least one further structural component of the tyre being processed on (Continued)

the forming drum without the pair of support rings in a work station of the carcass structure building line.

12 Claims, 1 Drawing Sheet

Related U.S. Application Data

(60) Provisional application No. 61/272,347, filed on Sep. 15, 2009.

(51) Int. Cl.
    *B29D 30/24*     (2006.01)
    *B29D 30/00*     (2006.01)
    *B29D 30/06*     (2006.01)
    *B29D 30/10*     (2006.01)

(52) U.S. Cl.
CPC ......... *B29D 30/0662* (2013.01); *B29D 30/20* (2013.01); *B29D 30/245* (2013.01); *B29D 2030/0038* (2013.01); *B29D 2030/0055* (2013.01); *B29D 2030/105* (2013.01); *B29D 2030/202* (2013.01); *B29D 2030/204* (2013.01); *B29D 2030/206* (2013.01)

(58) Field of Classification Search
CPC .... B29D 2030/0022; B29D 2030/0044; B29D 2030/0055; B29D 2030/202; B29D 2030/204; B29D 2030/246; B29D 2030/2607; B29D 2030/3278; B29D 30/245
See application file for complete search history.

(56) References Cited

U.S. PATENT DOCUMENTS

| | | | |
|---|---|---|---|
| 3,140,216 | A | 7/1964 | Shilts et al. |
| 4,286,643 | A | 9/1981 | Chemizard et al. |
| 6,979,378 | B2 | 12/2005 | Okada et al. |
| 2002/0189744 | A1 | 12/2002 | Caretta et al. |
| 2003/0056880 | A1 | 3/2003 | Lemaire et al. |
| 2005/0103448 | A1 | 5/2005 | Lemaire et al. |
| 2009/0160096 | A1 | 6/2009 | Currie et al. |
| 2012/0138213 | A1* | 6/2012 | Marchini ............. B29D 30/005 156/110.1 |

FOREIGN PATENT DOCUMENTS

| | | | | |
|---|---|---|---|---|
| EP | 0 776 756 A2 | | 6/1997 | |
| EP | 776756 A2 | * | 6/1997 | ......... B29D 30/0016 |
| JP | 2009-516601 | | 4/2009 | |
| JP | 2010-540275 | | 12/2010 | |
| RU | 2 132 777 | | 7/1999 | |
| RU | 2 291 780 | | 1/2007 | |
| WO | WO 01/089818 A1 | | 11/2001 | |
| WO | WO 2006/033120 | | 3/2006 | |
| WO | WO 2008/087671 A1 | | 7/2008 | |
| WO | WO 2008/099236 A1 | | 8/2008 | |
| WO | WO 2009/040594 A1 | | 4/2009 | |
| WO | WO 2009/081220 | | 7/2009 | |
| WO | WO-2010/070374 A1 | * | 6/2010 | |

OTHER PUBLICATIONS

English-languaae translation of Russian Decision of Grant Patent dated Aug. 25, 2014 in corresponding Russian Application No. 2012108842/05(013281).

Notice of Reasons for Rejection dated Feb. 4, 2015 by the Japanese Patent Office in corresponding Application No. JP 2012-524296 (4 pages).

English-language translation of Notice of Reasons for Rejection dated Feb. 4, 2015 by the Japanese Patent Office in corresponding Application No. JP 2012-524296 (5 pages).

English-language translation of Notification of First Office Action dated Dec. 13, 2013, by State Intellectual Property Office of the People's Republic of China in corresponding Application No. CN 201080035384.0 (11 pages).

International Search Report dated Jan. 4, 2011 by the European Patent Office in corresponding International Application No. PCT/IB2010/001925.

* cited by examiner

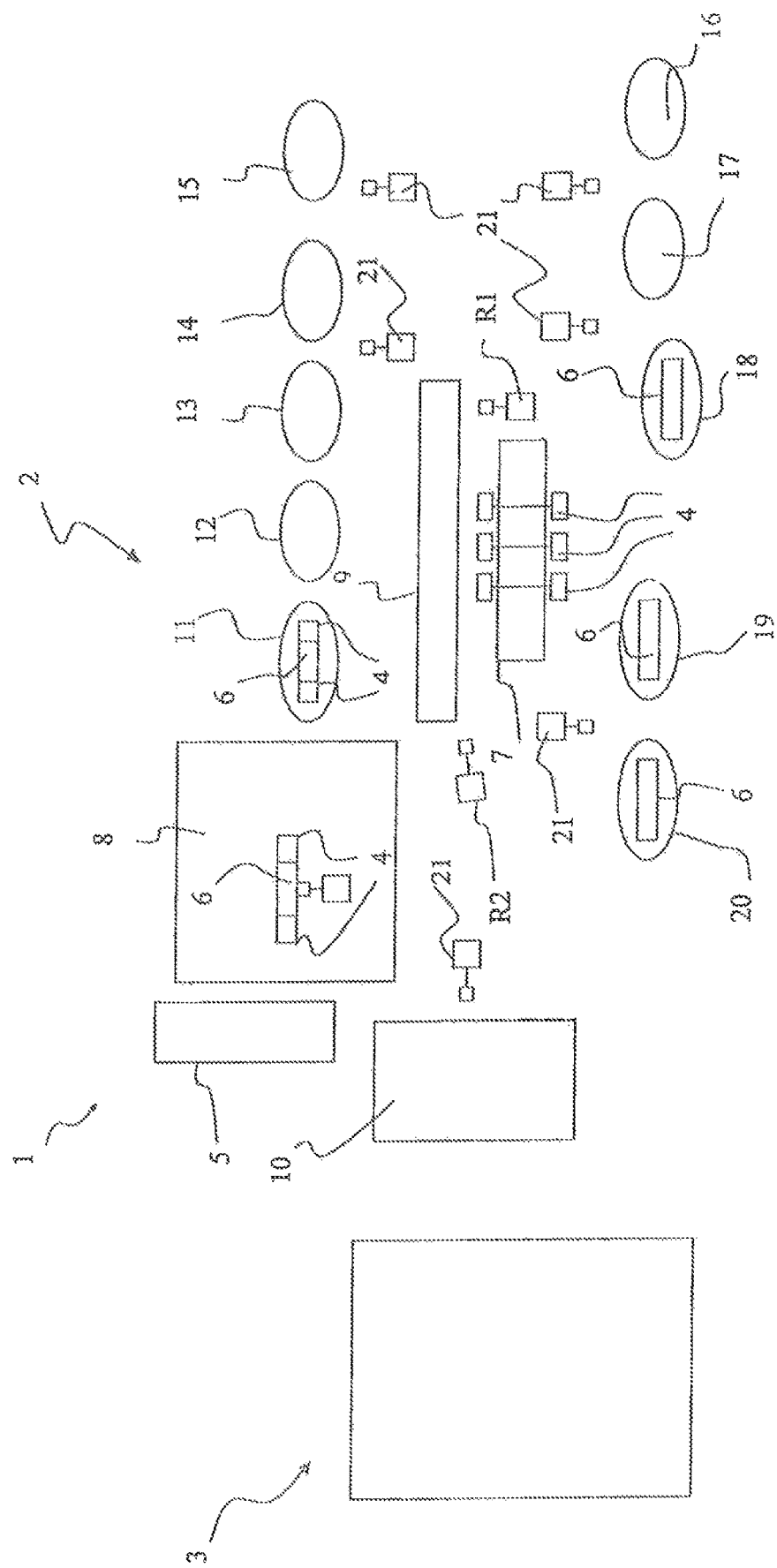

PROCESS FOR BUILDING TYRES FOR VEHICLE WHEELS

CROSS REFERENCE TO RELATED APPLICATIONS

This application is a division of U.S. application Ser. No. 13/389,777, filed Feb. 9, 2012, which is a national phase application based on PCT/IB2010/001925, filed Jul. 29, 2010, and claims the priority of Italian Patent Application Number MI2009A001468, filed Aug. 12, 2009, and the benefit of U.S. Provisional Application No. 61/272,347, filed Sep. 15, 2009, the content of all of which is incorporated herein by reference.

BACKGROUND

Field of the Invention

The present invention relates to a method and a process for building tyres for vehicle wheels.

The present invention also relates to a plant for building tyres for vehicle wheels, usable for carrying out the aforementioned process.

Description of the Related Art

Tyre production cycles envisage that, after a building process wherein the various components of the tyre itself are made and/or assembled in one or more assembly lines, a moulding and vulcanization process is carried out in a suitable vulcanization line, suitable for defining the tyre structure according to desired tread geometry and design.

A tyre generally comprises a toroidally ring-shaped carcass including one or more carcass plies, strengthened with reinforcing cords lying in substantially radial planes (a radial plane contains the rotation axis of the tyre). Each carcass ply has its ends integrally associated with at least one metal reinforcing annular structure, known as bead core, constituting the reinforcing of the beads, i.e. the radially inner ends of the tyre, having the function of enabling the assembling of the tyre with a corresponding mounting rim. Placed crown wise to said carcass is a band of elastomeric material, called tread band, within which, at the end of the moulding and vulcanization steps, a raised pattern is formed for ground contact. A reinforcing structure, generally known as belt structure, is arranged between the carcass and the tread band. Such structure usually comprises, in the case of tyres for cars, at least two radially overlapped strips of rubber fabric provided with reinforcing cords, usually of metal, arranged parallel to each other in each strip and crossed with the cords of the adjacent strip, preferably symmetrically arranged with respect to the equatorial plane of the tyre. Preferably, the belt structure further comprises in a radially outer position, at least on the ends of the underlying belt strips, also a third layer of textile or metal cords, arranged circumferentially (at 0 degrees).

Finally, in tyres of the tubeless type, a radially inner layer, called liner, is present which has imperviousness features for ensuring the air-tightness of the tyre itself.

To the aims of the present invention and in the following claims, by the term "elastomeric material" it is intended a composition comprising at least one elastomeric polymer and at least one reinforcing filler. Preferably, such composition further comprises additives such as cross-linking and/or plasticizing agents. By virtue of the cross-linking agents, such material may be cross-linked by heating, so as to form the final manufactured article.

In the present context, by the term "green tyre" it is indicated a tyre obtained by the budding process and not moulded and vulcanized yet.

In the present description and in the following claims, by "elementary component" it is meant an elementary semifinished product in the form of at least one of the following: a continuous elongated element of elastomeric material; a rubber metal or textile reinforcing cord, that is coated with elastomeric material; a ribbon-like element of elastomeric material cut to size comprising at least two textile or metal cords, hereinafter called "strip-like element."

In the present description and in the following claims, by "structural component" of the tyre it is meant any part of the tyre suitable for carrying out a function or a portion thereof. For example, structural components therefore are the liner, the under-liner, the abrasion-proof element, the bead core, the bead filler, the carcass ply, the belt strip, the belt under-layer, the tread band under-layer, the sidewall inserts, the sidewalls, the tread band, the reinforcing inserts.

In the present description and in the following claims, by the term "managing" it is meant an operation of movement within the building plant, or of support and/or of holding in stand-by during the building.

WO 2009/040594, by the same Applicant, describes a plant and a process for producing tyres for vehicle wheels, said process comprising the steps of:

a) building a carcass structure of a green tyre on a first forming drum in at least one line for assembling the carcass structure, said carcass structure comprising at least one carcass ply and a pair of anchoring annular structures;

b) building a crown structure of a green tyre on at least one second forming drum in at least one line for building the crown structure, said crown structure comprising at least one belt structure and a tread band;

c) toroidally shaping said carcass structure assembling it to said crown structure in at least one station for assembling and shaping the tyre being processed, said assembly and shaping station being synchronised with said line for building the carcass structure and with said line for building the crown structure;

wherein each carcass structure is associated with the respective first forming drum whereon it is built till the end of step c) of shaping and assembly the tyre being processed;

d) moulding and vulcanizing the green shaped tyre in at least one line for moulding and vulcanizing the tyre separate from said assembly and shaping station.

WO 2008/099236 by the same Applicant, describes a forming drum for building tyres having at least one outer surface and provided with auxiliary support elements capable of being moved in a removable manner close to the forming drum on axially opposite sides and having respective support surfaces that extend axially in the prosecution of the outer surface.

In the plants of the type described in WO 2009/040594, it is often necessary to dispense elementary components in zones axially external to the forming drum. Therefore, it is necessary to support such elementary components that would otherwise deflate around the forming drum itself. To this end, the Applicant has noted that it is possible to use forming drums and auxiliary support elements of the type described in WO 2008/099236.

The Applicant has further verified that in building plants of this type, using forming drums and auxiliary support elements associable with them, managing drum transfers is often complex as it also comprises managing the transfers of the relative auxiliary support elements.

Moreover, in such cases, work stations are poorly accessible by the operators, who should instead be able to move easily in order to ensure proper plant operation and suitable maintenance of the same.

SUMMARY

The Applicant has perceived that in order to build tyres by means of processes of the type described in WO 2009/040594 using forming drums and auxiliary support elements of the type described in WO 2008/099236, and in order to prevent cumbersome plants and achieve good accessibility to each work station, it is necessary to provide steps for removing and managing support elements, where these are not needed.

The Applicant has found that the above mentioned problems can be solved by using a method for building tyres by means of a building plant comprising forming drums and auxiliary support elements associable and dissociable with/from them, wherein the managing of at least one forming drum, at least one pair of support rings and at least one forming drum associated with a pair of support rings, is carried out during the steady operating condition of said building plant independently and simultaneously with respect to each other.

More precisely, according to a first aspect thereof, the invention relates to a method for building tyres for vehicle wheels in a building plant comprising a plurality of forming drums whereon said tyres are built, and a plurality of pairs of support rings removably associable with at least one of said plurality of forming drums, said method comprising:
  a') managing, among said plurality of forming drums, at least one forming drum unprovided with support rings;
  b') managing, among said plurality of pairs of support rings, at least one pair of support rings dissociated from the respective forming drum;
  c') managing, among said plurality of forming drums, at least one forming drum associated with a pair of support rings, among said plurality of pairs of support rings;
  wherein each of said operations a'), b') and c') is carried out independently and simultaneously with respect to the remaining operations a'), b') and c') during the steady operating condition of said building plant.

The Applicant believes that according to the above solution the support rings, which are associated and dissociated from the forming drums in the various building steps, have their own management separate from the management of the forming drums, although operatively associated with it, allowing an optimisation of spaces and of the building operations along the plant building lines.

According to a second aspect thereof, the invention relates to a building plant for building tyres for vehicle wheels comprising a set of elements including forming drums whereon said tyres are built, and pairs of support rings suitable for cooperating with said forming drums in building said tyres wherein, at steady operating conditions of the building plant, the following three subsets of elements are present:
  i) forming drums unprovided with support rings;
  ii) pairs of support rings dissociated from respective forming drums;
  iii) forming drums associated with pairs of support rings;
  and wherein each of said subsets i), ii) and iii) is physically separate and independent from the remaining subsets i), ii) and iii).

According to a third aspect thereof, the invention relates to a process for building tyres for vehicle wheels, each tyre comprising a carcass structure having at least one carcass ply and a pair of anchoring annular structures, wherein said building process comprises the following steps carried out in a carcass structure building line:
  a) associating a pair of support rings with a forming drum in a support rings associating work station;
  b) building at least one structural component of the tyre being processed on the forming drum provided with said pair of support rings in at least one work station of the carcass structure building line;
  c) removing the pair of support rings from the forming drum in a support rings removing work station;
  d) transferring the pair of support rings dissociated from the forming drum in a support rings temporary storage;
  e) building at least one further structural component of the tyre being processed on the forming drum without the pair of support rings in a work station of the carcass structure building line.

The present invention, in at least one of the above aspects thereof, can exhibit at least one of the following preferred features.

Preferably, said operation a') comprises at least one of the following steps of structural components building: applying at least one pair of anchoring annular structures to axially opposite ends of at least one carcass ply;
  applying at least one portion of an abrasion-proof element;
  applying at least one portion of sidewalls of the tyre being processed.

Preferably, said operation b') comprises at least one among the steps of:
  transferring said at least one pair of support rings from one support rings removing work station from the respective forming drum to a support rings temporary storage;
  transferring said at least one pair of support rings from a support rings temporary storage to a work station for associating support rings with the respective forming drum.

Preferably, said operation c') comprises the step of building at least one of the following structural components: bead reinforcing fabric, at least one portion of an abrasion-proof element, liner, under-liner, layer of self-sealing material, at least one first carcass ply, internal reinforcements associated with said first carcass ply, intermediate elements arranged between said first carcass ply and said internal reinforcements.

Preferably, in the plant according to the invention, the number of elements of subset ii) is larger than the number of elements of subset i). In this way it is possible to choose, for each forming drum, the pair of support rings most suitable for the type of tyre to make, thus allowing a high technological flexibility to be obtained.

Alternatively, it is possible to provide for the number of elements of subset ii) to be equivalent to the number of elements of subset i). In this case it is possible to ensure a univocal connection between each forming drum and pair of support rings. In other words, t is possible to ensure that each forming drum is univocally associable with a pair of support rings suitable for such forming drum.

Alternatively, the number of elements of subset ii) can be smaller than the number of elements of subset i) so as to reduce investment and maintenance cost of the building plant.

Advantageously, in the plant for building tyres for vehicle wheels according to the invention, each tyre comprises a carcass structure having at least one carcass ply and a pair of anchoring annular structures, said plant comprising a carcass structure building line, which in turn comprises:
- said forming drums;
- said pairs of support rings removably associable with said forming drums;
- at least one support rings associating work station including at least one device for associating at least one of said pairs of support rings with the respective forming drum;
- at least one support rings removing work station including at least one device for removing at least one of said pairs of support rings from the forming drum.

Advantageously, the plant in said carcass structure building line comprises a first transfer device suitable for transferring the forming drum dissociated from the pair of support rings from the support rings removing work station to a work station of the carcass structure building line.

Advantageously, the plant in said carcass structure building line comprises a second transfer device suitable for transferring the pair of support rings dissociated from the forming drum to a support rings temporary storage.

According to a preferred embodiment of the building process of the invention, after step a) a step is carried out for:
- a1) transferring said forming drum, associated with the pair of support rings, from a work station of the carcass structure building line to the next work station.

Preferably, the building process comprises, before step c), a step of:
- b1) transferring the forming drum associated with the pair of support rings in a support rings removing work station.

Advantageously, the building process involves, after step c), a step of:
- c1) transferring the forming drum without the pair of support rings from the support rings removing work station to a work station of the carcass structure building line;

and/or a step of:
- c2) transferring the forming drum without the pair of support rings from a work station of the carcass structure building line to the next work station.

The building process, according to a preferred embodiment of the invention, after step d) comprises a step of:
- d1) transferring the pair of support rings from the support rings temporary storage to the support rings associating work station.

Preferably, at least one between step b1) and step c1) is carried out by means of a first transfer device.

Advantageously, at least one between steps d) and d1) is carried out by means of a second transfer device.

Even more preferably, said second transfer device is different from the first transfer device.

Preferably, at least one between said first transfer device and said second transfer device comprises a robot arm.

According to preferred embodiments of the process of the invention, step b) comprises at least one of the following steps of structural components building:
- applying at least one bead reinforcing fabric in a position radially external and at least partly axially external to the forming drum;
- applying at least one portion of an abrasion-proof element;
- applying a liner layer in a position radially external to said forming drum;
- applying an under-liner layer in a position radially external to said liner;
- applying a self-sealing material layer in a position radially external to the under-liner layer;
- applying at least a first carcass ply in a position radially external to said forming drum;
- applying a plurality of internal reinforcements at said at least one carcass ply;
- applying a plurality of first intermediate elements between said at least one carcass ply and said plurality of internal reinforcements.

Preferably, step e) comprises at least one of the following steps of structural components building:
- applying at least one pair of anchoring annular structures to the axially opposite ends of said at least one carcass ply;
- applying at least one portion of an abrasion-proof element;
- applying at least one portion of sidewalls of the tyre being processed.

Even more preferably, the step of applying the anchoring annular structures comprises the following sub-steps:
- placing the anchoring annular structures at the axially opposite ends of said at least one carcass ply; and
- folding the ends of said at least one carcass ply onto said at least one carcass ply so as to form flaps that contain said anchoring annular structures.

The building process of the invention advantageously comprises also the step of:
- building a crown structure in at least one crown structure building line comprising a plurality of work stations, said crown structure comprising at least one belt structure.

According to preferred embodiments, the building process comprises the step of:
- toroidally shaping the carcass structure by assembling it to the crown structure in at least one work station for shaping and assembling the tyre being processed.

The invention also provides a process for producing tyres for vehicle wheels comprising, after the tyre building process described above, a step of moulding and vulcanizing the shaped green tyre in at least one tyre moulding and vulcanization line.

According to preferred embodiments of the building plant of the invention, the first transfer device is also suitable for transferring the forming drum, which the pair of support rings is associated with, from a work station of the carcass structure building line to the support rings removing station.

Preferably, the second transfer device is also suitable for transferring the pair of support rings from the support rings temporary storage to the support rings associating work station.

Advantageously, the first transfer device is also suitable for transferring the forming drum dissociated from the pair of support rings from one work station of the carcass structure building line to the next work station.

Preferably, at least one between said first transfer device and said second transfer device comprises a robot arm.

According to a preferred embodiment of the plant of the invention, the carcass structure building line further comprises a forming drums temporary storage.

Preferably, the carcass structure building line comprises at least one of the following work stations:

- a station for applying anchoring annular structures provided with devices for applying at least one pair of anchoring annular structures to the axially opposite ends of said at least one carcass ply, after the pair of support rings has been dissociated from the forming drum;
- a first abrasion-proof application station provided with devices for applying at least one portion of an abrasion-proof element, after the pair of support rings has been dissociated from the forming drum;
- a first sidewall building station provided with devices for applying at least one portion of sidewalls of the tyre being processed after the pair of support rings has been dissociated from the forming drum.

According to preferred embodiments, the carcass structure building line further comprises at least one of the following work stations:

- a reinforcing fabric applying station provided with devices for applying at least one bead reinforcing fabric on a forming drum, which a pair of support rings is associated with;
- a second abrasion-proof application station provided with devices for applying at least one portion of an abrasion-proof element in a position radially external to said forming drum, which a pair of support rings is associated with;
- a liner application station provided with devices for applying a liner layer in a position radially external to the forming drum, which a pair of support rings is associated with;
- an under-liner application station provided with devices for applying an under-liner layer in a position radially external to said liner;
- a ply application station provided with devices for applying at least one first carcass ply in a position radially external to the forming drum;
- a station for applying first intermediate elements provided with devices for applying a plurality of first intermediate elements at said at least one carcass ply;
- an internal reinforcements application station provided with devices for applying a plurality of internal reinforcements at first intermediate elements.

Preferably, the carcass structure building line also comprises a station for applying self-sealing material provided with devices for applying a layer of self-sealing material.

Advantageously, the anchoring annular structures applying station is also provided with devices for folding the ends of said at least one carcass ply on said at least one carcass ply, so as to form flaps that contain said anchoring annular structures.

According to a preferred embodiment, the building plant of the invention comprises at least one crown structure building line comprising a plurality of work stations, each crown structure comprising at least one belt structure.

Preferably, the building plant comprises at least one station for shaping and assembling the tyre being processed suitable for shaping the carcass structure by assembling it to the crown structure of the tyre being processed.

Preferably, the building plant comprises, in said carcass structure building line, a plurality of transfer devices suitable for transferring the forming drum associated or not with the support rings from one work station wherein a structural component is built to the next work station.

The invention also provides a plant for manufacturing tyres comprising a plant for building tyres as described above and at least one tyre moulding and vulcanization line.

BRIEF DESCRIPTION OF THE DRAWINGS

Further features and advantages of invention will appear more clearly from the following description of some preferred examples of processes and plants for building tyres according to the invention, made by way of an indicative non-limiting example with reference to the annexed drawing, wherein:

FIG. 1 shows a schematic layout of a plant for building tyres for vehicle wheels wherein the method and the process according to an embodiment of the present invention are implemented.

DETAILED DESCRIPTION

With reference to FIG. 1, reference numeral 1 globally indicates a plant for building green tyres for vehicle wheels according to a preferred embodiment of the present invention.

In the preferred embodiment shown in the FIGURE, such building plant 1 comprises a carcass structure building line 2 and a crown structure building line 3. The carcass structure comprises at least one carcass ply and a pair of anchoring annular structures and the crown structure comprises at least one belt structure. Preferably, the crown structure also comprises a tread band.

Each of said carcass structure assembling line 2 and crown structure building line 3 comprises a plurality of work stations.

The building plant 1 comprises a station 10 for shaping and assembling the tyre being processed wherein the carcass structure is shaped by assembling it to the crown structure of the tyre being processed.

The carcass structure building line 2 comprises at least one forming drum 6 whereon at least the carcass structure of the tyre being processed is built, and at least one pair of support rings 4 removably associable with the forming drum 6. Such support rings cooperate with the forming drum 6 in building the carcass structure of the tyre being processed.

The carcass structure building line 2 further comprises at least one support rings associating station 8 suitable for associating pairs of support rings 4 with forming drums 6. Such station includes at least one device for associating the pair of support rings 4 with the forming drum 6.

According to the invention, the carcass structure building line 2 comprises at least one support rings removing station 9 which is suitable for removing pairs of support rings 4 from the forming drums 6. It comprises at least one device for removing the pair of support rings 4 from the forming drum 6.

According to the invention, the carcass structure building line 2 further comprises a first transfer device R1 and a second transfer device R2 different from the first transfer device R1.

Said first transfer device R1 is suitable for transferring the forming drum 6 dissociated from the pair of support rings 4 from the support rings removing station 9 to a work station of the carcass structure building line 2; said second transfer device R2 is suitable for transferring the pair of support rings 4 dissociated from the forming drum to a support rings temporary storage 7.

The first transfer device R1 is also suitable for transferring the forming drum 6, which the pair of support rings 4 is associated with, from one work station of the carcass structure building line 2 to the support rings removing station 9. Alternatively it is possible to provide a further transfer device.

Such first transfer device R1 is also suitable for transferring the forming drum 6 dissociated from the pair of support rings 4 from one work station of the carcass structure building line 2 to the next work station. Alternatively it is possible to provide a further transfer device.

The second transfer device R2 is also suitable for transferring the pair of support rings 4 from the support rings temporary storage 7 to the support rings associating station 8. Also in this case, it is possible to provide a further transfer device to carry out this function.

In the preferred embodiment shown in the FIGURE, said first transfer device R1 and said second transfer device R2 comprise a robot arm.

The carcass structure building line 2 further comprises a forming drums temporary storage 5 suitable for temporarily storing forming drums 6.

According to preferred embodiments of the invention, the carcass structure building line 2 further comprises at least one among:
- a station for applying anchoring annular structures 18 provided with devices for applying at least one pair of anchoring annular structures to the axially opposite ends of said at least one carcass ply, after the pair of support rings has been dissociated from the forming drum 6;
- a first abrasion-proof application station 19 provided with devices for applying at least one portion of an abrasion-proof element, after the pair of support rings has been dissociated from the forming drum 6; and
- a first sidewall building station 20 provided with devices for applying at least one portion of sidewalls of the tyre being processed after the pair of support rings has been dissociated from the forming drum 6.

Preferably, the station for applying anchoring annular structures 18 is also provided with devices for folding the ends of said at least one carcass ply on said at least one carcass ply, so as to form flaps that contain said anchoring annular structures.

The carcass structure building line 2 shown in the FIGURE preferably comprises also the following work stations:
- a reinforcing fabric applying station 11 provided with devices for applying at least one bead reinforcing fabric on a forming drum, which a pair of support rings is associated with;
- a second abrasion-proof application station 12 provided with devices for applying at least one portion of an abrasion-proof element in a position radially external to said forming drum, which a pair of support rings is associated with;
- a liner application station 13 provided with devices for applying a liner layer in a position radially external to the forming drum, which a pair of support rings is associated with;
- an under-liner application station 14 provided with devices for applying an under-liner layer in a position radially external to said liner;
- a ply application station 15 provided with devices for applying at least a first carcass ply in a position radially external to the forming drum;
- a station for applying first intermediate elements 16 provided with devices for applying, at said at least one carcass ply, a plurality of first intermediate elements;
- an internal reinforcement application station 17 provided with devices for applying, at first intermediate elements, a plurality of internal reinforcements.

The carcass structure building line 2 may also comprise a station for applying self-sealing material provided with devices for applying a layer of self-sealing material, not shown in the FIGURE.

It is possible to provide for the presence of a tyre moulding and vulcanization line which, together with the building plant 1, forms a plant for producing finished tyres.

Preferably, the carcass structure building line 2 comprises a plurality of transfer devices 21 (only some of which are shown in FIG. 1) suitable for transferring the forming drum 6 associated or not with the support rings 4 from one work station wherein a structural component is built or assembled to the next work station.

Even more preferably, at least one transfer device 21 comprises a robot arm.

In the following operating example of the building plant 1, it is understood that when not otherwise specified, transfers of the forming drum 6 associated or not with the support rings 4 are carried out by the above transfer devices 21.

Said building plant 1 may further comprise a line for preparing elementary components which are suitable for being fed in the carcass structure building line 2 and/or in the crown structure building line 3 through special elementary component feeding stations.

According to the present invention, in the plant 1 for building tyres for vehicle wheels—comprising a set of elements including forming drums 6 whereon said tyres are built, and pairs of support rings 4 suitable for cooperating with said forming drums 6 in building said tyres—at steady operating conditions of the building plant 1, the following three subsets of elements are present:
i) forming drums 6 unprovided with support rings 4;
ii) pairs of support rings 4 dissociated from respective forming drums 6;
iii) forming drums 6 associated with pairs of support rings 4.

In particular, according to the present invention, at steady operating condition, each of said subsets i), ii) and iii) is physically separate and independent from the remaining subsets i), ii) and iii).

In other words, at steady operating conditions it is possible to find forming drums 6 released from pairs of support rings 4, pairs of support rings released from forming drums 6 and forming drums 6 associated with pairs of support rings 4.

The numbers of elements of subsets i), ii) and iii) are selected according to production requirements.

If technological flexibility has to be privileged, the number of elements of subset ii) is larger than the number of elements of subset i). If investment and maintenance costs are to be reduced, a number of elements of subset ii) will be chosen to be smaller than the number of elements of subset i). Finally, if for production requirements it is necessary that each element of subset i) is univocally connected to an element of subset ii) and vice versa, the above numbers must be equal. In this way, in fact, each pair of support elements 4, once removed from the corresponding forming drum 6, remains in stand-by until it is associated with the same forming drum 6.

With reference to the building plant 1 illustrated in FIG. 1, a preferred embodiment of a process for building a tyre according to the invention shall now be described.

A forming drum 6 is transferred to a support rings associating station 8. At the same time, the second transfer device R2 selects and picks up a pair of support rings 4 from a support rings temporary storage 7 and transfers it to the same support rings associating station 8, according to a step d1).

In the above support rings associating station 8, step a) of associating support rings 4 with the forming drum 6 is carried out.

Subsequently, the forming drum 6 provided with the pair of support rings 4, is transferred to the reinforcing fabric applying station 11 wherein, according to a step b), a structural component is built, in this case at least one bead reinforcing fabric is built in a position radially external and at least partly axially external to the forming drum 6.

Afterwards, the forming drum 6 provided with the pair of support rings 4 is transferred to the second abrasion-proof application station 12, according to a step a1). In such station, a further step b) is carried out by applying at least one portion of an abrasion-proof element in a position radially external to the forming drum 6.

At this point, the forming drum 6 provided with the pair of support rings 4 is transferred to the liner application station 13 wherein a further step b) is carried out by-applying a layer of liner in a position radially external to the forming drum 6.

Afterwards, the forming drum 6 provided with the pair of support rings 4 is transferred to the under-liner application station 14 where a layer of under-liner is applied in a position radially external to the liner layer.

The forming drum 6 provided with the pair of support rings 4 is then transferred sequentially to the stations of: ply-application 15, application of first intermediate elements 16, and application of internal reinforcements 17 wherein the following steps are respectively carried out: applying at least one first carcass ply in a position radially external to the forming drum 6, applying a plurality of internal reinforcements at the carcass ply, and applying a plurality of first intermediate elements between the carcass ply and the plurality of internal reinforcements.

Afterwards, the forming drum 6 provided with the pair of support rings 4 is transferred to a support rings removing station 9, according to a step b1), by means of the first transfer device R1.

Here, a step c) of removal of the pair of support rings 4 from the forming drum 6 is carried out.

At this point, the transfers of the forming drum 6 and of the pair of support rings 4 become separate and independent. In fact, the forming drum 6 without the pair of support rings 4 is transferred to an anchoring annular structures applying station 18, according to a step c1), by means of the first transfer device R1, whereas the pair of support rings 4 dissociated from the forming drum 6 is transferred to the support rings temporary storage 7, according to a step d), by means of the second transfer device R2.

At least one pair of anchoring annular structures is applied to the axially opposite ends of the carcass ply in the anchoring annular structures applying station, according to a step e) of the process of the invention. In particular, the anchoring annular structures are first placed at the axially opposite ends of the carcass ply and then enclosed by the carcass ply by forming flaps obtained by folding the ends of the carcass plies on themselves or on the radially innermost ply layers.

Therefore, according to a step c2), the forming drum 6 is transferred to the first abrasion-proof application station 19 wherein a portion of abrasion-proof element is applied, and then to a sidewall building station 20 wherein at least one portion of sidewalls of the tyre being processed is built.

At this point, the forming drum 6 may remain in a stand-by position or may be immediately transferred to the shaping and assembly station 10, according to the requirements of the production cycle.

In the shaping and assembly station 10, the carcass structure is toroidally shaped and assembled to the crown structure of the tyre being processed coming from the crown structure building line 3 wherein in the meantime it has been built.

The shaped tyre is then removed from the forming drum 6. The tyre can then be transferred to a moulding and vulcanization line to obtain the finished product.

At this point, the forming drum 6 without the tyre being processed, is transferred directly to the support rings associating station 8 where it is associated with a pair of support rings 4 and, according to production requirements, it can be transferred to the forming drums temporary-storage 5, or start a new building cycle.

At the same time, the pair of support rings 4 that has been removed from the forming drum 6 and transferred to the support rings temporary storage 7, is transferred to the support rings associating station 8, according to the above step d1), by means of said second transfer device R2, so as to be ready to be associated with a forming drum 6 and thus start a new building cycle.

The building process described is applied at the same time on a plurality of tyres that are built concurrently. In particular, it is possible to build at the same time tyres of different types thanks to the high flexibility of the process and building plant 1 of the type described type.

The invention claimed is:

1. A process for building tyres for mounting on vehicle wheels in a carcass structure building line, each tyre comprising a carcass structure having at least one carcass ply and a pair of anchoring annular structures, comprising the steps of:
   a) transferring a forming drum to a support rings associating work station;
   a1) transferring a pair of support rings from a support rings temporary storage, where a plurality of pairs of support rings are stored, to the support rings associating work station;
   a2) associating the pair of support rings with the forming drum in the support rings associating work station;
   b) building at least one structural component of the carcass structure of a tyre being processed on the forming drum provided with said pair of support rings in a work station of the carcass structure building line;
   b1) transferring, with a first transfer device comprising a first robot arm, the forming drum associated with the pair of support rings from the work station of the carcass structure building line to a support rings removing work station;
   c) removing the pair of support rings from the forming drum in the support rings removing work station;
   d) transferring, with a second transfer device comprising a second robot arm, the pair of support rings dissociated from the forming drum from the support rings removing work station to the support rings temporary storage;
   e) building at least one further structural component of the carcass structure of the tyre being processed on the forming drum without the pair of support rings in a further work station of the carcass structure building line,
   wherein the transferring in a1) is carried out with said second transfer device or further transfer device comprising a robot arm, wherein the process comprises removing a built shaped green tyre from the forming drum, which is unprovided with the pair of support rings, and transferring the forming drum from which the built shaped green tyre has been removed, without the built shaped green tyre, to the support rings associating work station, wherein it is associated with any pair of support rings from the plurality of the pairs of support rings, and wherein the process is repeated and the carcass structure building line selectively transfers the forming drum, associated with any pair of support rings from the plurality of pairs of support rings, from said support rings associating work station to a forming drums temporary storage, and transfers directly the forming drum, associated with any pair of support rings from the plurality of pairs of support rings, to start a new building cycle without the forming drum entering the forming drums temporary storage.

2. The building process according to claim 1, comprising, after step b) and before step e):
building at least another structural component of the carcass structure of tyre being processed on the forming drum provided with said pair of support rings in another work station of the carcass structure building line.

3. The building process according to claim 1, comprising, after step c) and before step e):
c1) transferring the forming drum without the pair of support rings from the support rings removing work station to the further work station of the carcass structure building line.

4. The building process according to claim 3, wherein c1) is carried out by using the first transfer device.

5. The building process according to claim 1, comprising after step e):
transferring the forming drum without the pair of support rings from the further work station of the carcass structure building line to a next work station of the carcass structure building line.

6. The building process according to claim 1, wherein step e) comprises at least one of the following steps for building structural components:
applying at least one pair of anchoring annular structures to axially opposite ends of said at least one carcass ply;
applying at least one portion of an abrasion-proof element; and
applying at least one portion of sidewalls of the tyre being processed.

7. The building process according to claim 6, wherein the step of applying the anchoring annular structures comprises the following sub-steps:
placing the anchoring annular structures at the axially opposite ends of said at least one carcass ply; and
folding ends of said at least one carcass ply onto said at least one carcass ply so as to form flaps that contain said anchoring annular structures.

8. The building process according to claim 1, comprising:
building a crown structure in at least one crown structure building line comprising a plurality of work stations.

9. The building process according to claim 8, comprising, after step e):
f) transferring the forming drum without the pair of support rings from the further work station of the carcass structure building line to a shaping and assembly work station.

10. The building process according to claim 9, comprising:
toroidally shaping said carcass structure and assembling said carcass structure to said crown structure in said shaping and assembling work station to obtain the shaped green tyre.

11. The building process according to claim 10, comprising:
g) removing the obtained shaped green tyre from the forming drum and transferring the removed shaped green tyre to a moulding and vulcanization line to obtain a finished tyre.

12. A process for building tyres for mounting on vehicle wheels in a carcass structure building line, each tyre comprising a carcass structure having at least one carcass ply and a pair of anchoring annular structures, comprising the steps of:
a) transferring a forming drum to a support rings associating work station;
a1) transferring a pair of support rings from a support rings temporary storage, where a plurality of pairs of support rings are stored, to the support rings associating work station;
a2) associating the pair of support rings with the forming drum in the support rings associating work station;
b) building at least one structural component of the carcass structure of a tyre being processed on the forming drum provided with said pair of support rings in a work station of the carcass structure building line;
b1) transferring, with a first transfer device comprising a first robot arm, the forming drum associated with the pair of support rings from the work station of the carcass structure building line to a support rings removing work station;
c) removing the pair of support rings from the forming drum in the support rings removing work station;
d) transferring, with a second transfer device comprising a second robot arm, the pair of support rings dissociated from the forming drum from the support rings removing work station to the support rings temporary storage;
e) building at least one further structural component of the carcass structure of the tyre being processed on the forming drum without the pair of support rings in a further work station of the carcass structure building line;
f) transferring the forming drum without the pair of support rings from the further work station of the carcass structure building line to a shaping and assembly work station;
building a crown structure in at least one crown structure building line comprising a plurality of work stations, said crown structure comprising at least one belt structure; and
toroidally shaping said carcass structure and assembling said carcass structure to said crown structure in said shaping and assembling work station to obtain a shaped green tyre,
wherein the transferring in a1) is carried out with said second transfer device or further transfer device comprising a robot arm,
wherein the process comprises removing the built shaped green tyre from the forming drum, which is unprovided with the pair of support rings, and transferring the forming drum from which the built shaped green tyre has been removed, without the built shaped green tyre, to the support rings associating work station, wherein it is associated with any pair of support rings from the plurality of the pairs of support rings, and wherein the process is repeated and the carcass structure building line selectively transfers the forming drum, associated with any pair of support rings from the plurality of pairs of support rings, from said support rings associating work station to a forming drums temporary storage, and transfers directly the forming drum, associated with any pair of support rings from the plurality of pairs of support rings, to start a new building cycle without the forming drum entering the forming drums temporary storage.

\* \* \* \* \*